United States Patent [19]

Schwartz

[11] 4,003,088
[45] Jan. 11, 1977

[54] LOCK OUT TAB FOR MAGNETIC DISC ENVELOPE
[75] Inventor: Vern Schwartz, Sunnyvale, Calif.
[73] Assignee: Information Terminals Corporation, Sunnyvale, Calif.
[22] Filed: Oct. 8, 1975
[21] Appl. No.: 620,656
[52] U.S. Cl. ................................. 360/60; 360/133
[51] Int. Cl.$^2$ .................. G11B 15/04; G11B 23/04
[58] Field of Search ................. 360/60, 133, 99, 86

[56] References Cited
UNITED STATES PATENTS

| | | | |
|---|---|---|---|
| 3,692,956 | 9/1972 | Northrup | 360/60 |
| 3,864,755 | 2/1975 | Hargis | 360/133 |
| 3,947,893 | 3/1976 | Hall, Sr. | 360/133 |

Primary Examiner—Jay P. Lucas
Attorney, Agent, or Firm—Lindenberg, Freilich, Wasserman, Rosen & Fernandez

[57] ABSTRACT

In a system of the type wherein a floppy magnetic disc enclosed in an envelope stores data on both sides, unless great care is taken in inserting the floppy disc into the using apparatus, which reads from or writes thereon, one can accidentally or erroneously erase or write over data. This invention provides a floppy disc with a hole which can align with one or the other of a pair of two holes through an envelope in which said disc rotates. An opaque moveable means can be positioned to block one or the other of these pair of holes. A photocell will produce enabling signals by sensing light passing through only one of the pair of holes when the floppy disc is positioned one way in the using apparatus and through the other of the pair of holes when the floppy disc is positioned another way in the using apparatus. Accordingly, only when the floppy disc is correctly positioned in the using apparatus can the transducer head be enabled to write or read.

4 Claims, 5 Drawing Figures

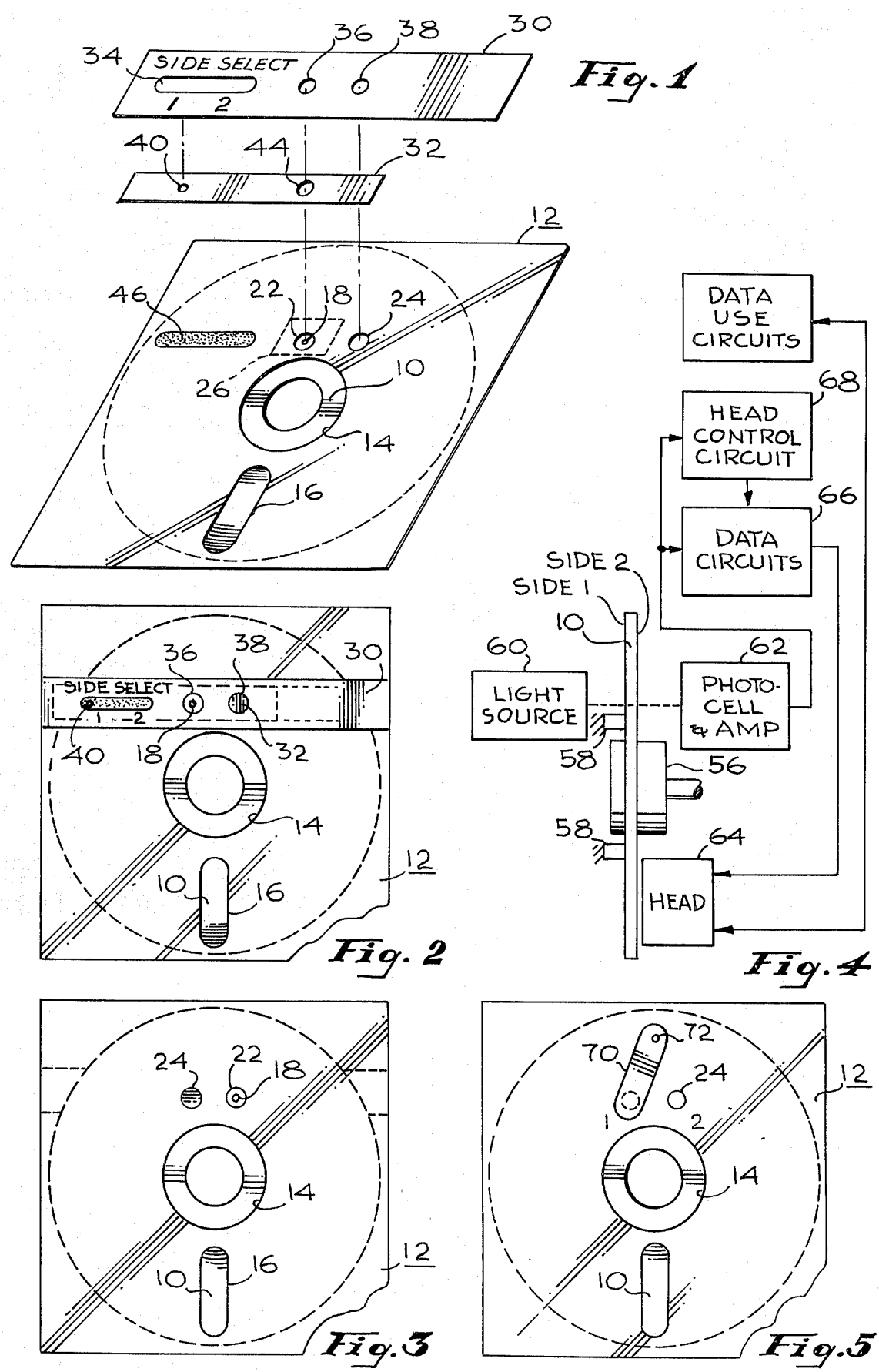

LOCK OUT TAB FOR MAGNETIC DISC ENVELOPE

BACKGROUND OF THE INVENTION

This invention relates to improvements in flexible magnetic disc storage systems.

A two-sided floppy disc has been described and shown, for example, in a patent by Paul F. Ward, U.S. Pat. No. 3,932,895, Sept. 10, 1974, and assigned to a common assignee. This is a magnetic disc which is retained within an envelope. Openings are provided in the envelope, on both sides, so that when the envelope is inserted into the equipment with which it is used, a hub engages the disc at a central opening and rotates it within the envelope. A magnetic read-write head or transducer, is simultaneously applied to the magnetic disc through the slot on one side of the envelope for performing the operation of reading and writing. If it is desired to read or write on the other side of the disc, the envelope is removed, reversed, and then reinserted into the associated equipment. The disc is insertable into the using apparatus with one or the other side in operative position adjacent the magnetic transducer with no distinction between the two sides other than markings on the envelope.

If it is desired to perform a writing operation, say on side 1 of the disc, and through inadvertence, the envelope containing the disc is inserted into the associated equipment with side 2 in position to be engaged by the reading head, obviously data will be erased and further, whatever information is written will probably be in the wrong location.

OBJECTS AND SUMMARY OF THE INVENTION

An object of this invention is to provide a system whereby an erasure or writing on an undesired side of a floppy magnetic disc is prevented.

Still another object of this invention is the provision of a simple system which insures that the side of a floppy disc which is presented to a magnetic transducer head is the desired side.

Yet another object of this invention is the provision of a simple and inexpensive arrangement for insuring that the side of a floppy disc upon which writing is to occur or from which reading is to occur is the desired side.

The foregoing and other objects of the invention are achieved in an arrangement wherein a floppy disc encased in an envelope has at least on hole. There are two openings in the envelope, one on either side of a center line of said envelope which are also near the center opening in the envelope which exposes the center of the disc. The disc hole will align with one or the other of the envelope holes as it is rotated. A moveable means having a hole therein may be supported on the envelope and is moveable to align this hole with one or the other of the two envelope openings.

A photocell is positioned in the equipment with which the disc is associated, opposite a light source. When the envelope is inserted into the equipment, one or the other of the two envelope holes adjacent to the center line of the disc is aligned with the photocell and light cells. If the moveable means is moved so that the aligned opening is uncovered, as the disc is rotated, the photocell produces enabling signals whereby the head can be used and data can be fed thereto or data will be read from the rotating disc. If the moveable means is positioned to block the aligned opening, then inadvertent erasure or reading is prevented.

BRIEF DESCRIPTION OF THE DRAWINGS

FIG. 1 is an exploded isometric view of an embodiment of the invention.

FIG. 2 is a plan view of one side of the floppy disc.

FIG. 3 is a view of the other side of the floppy disc.

FIG. 4 is a block schematic diagram representative of an electrical arrangement which can be used with the embodiment of the invention.

FIG. 5 is an alternative arrangement for an embodiment of the invention.

DESCRIPTION OF THE PREFERRED EMBODIMENTS

FIG. 1 shows an isometric exploded view of an embodiment of the invention. The floppy disc basically comprises a flexible plastic disc 10 coated on both sides with a suitable magnetic coating. The disc has a central opening and is enclosed in a rectangular envelope 12. The envelope has a central opening 14, which exposes a portion of the magnetic disc 10 which can be thereby engaged by a rotating hub, which is applied to one side thereof. The envelope has another somewhat rectangular shaped opening 16, on both sides, which enables bringing a magnetic transducer in operative engagement with one or the other of the surfaces of the disc 10.

A small hole 18, through the disc is provided. There are also provided two slightly larger holes 22, 24 in the envelope, which are positioned on either side of a center line through the envelope and equidistant from the center of the disc. As the disc rotates the hole 18 will sequentially align itself with first one, then the other of the envelope holes 22, 24.

When the disc is inserted into the using mechanism, which enables reading and writing from the disc surface, a rotatable hub engages a portion of the disc which is exposed, through the central opening 14 of the envelope and presses the envelope against a suitably apertured backing member, whereby upon rotation the disc is enabled to rotate within the envelope freely. The backing member also has provision for enabling a photocell 26, represented by the dotted lines, to be positioned opposite the location within the using apparatus, indicated by the hole 22. The using apparatus also contains a light source, whereby if the hole 22 is uncovered, and the hole 18 is aligned therewith, light can pass through and actuate the photocell.

A slide cover 30, which can be made of paper or plastic, or any suitable opaque material, is attached to the surface of the envelope and encloses a moveable slide 32. The slide cover 30 has 3 holes therethrough, respectively 34, 36 and 38. The holes 36 and 38, when the slide cover 30 is attached to the envelope 12, are aligned with the openings 22 and 24. A slide 32, is enclosed between the slide cover 30 and the envelope 12 is moveable, and can be moved by inserting a pointed object such as a ballpoint pen, or pencil, through an opening 34 to engage an opening 40 in the slide 32. Slide 32 has a second opening 44, which is spaced from the opening 40 at a distance so that when the opening 40 is over the number 1 shown on the slide cover 30, the opening 44 is aligned with the opening 22, and when the opening 40 is positioned over the number 2 shown on the slide cover 30, the opening 44 is positioned over the opening 24. The length of the slide 32 is such that when the opening 44 is aligned with the opening 22, the opening 24, is completely blocked by the slide material. Similarly, when the opening 44 is aligned with the opening 24, the opening 22 is blocked by the slide.

Accordingly, from the foregoing, it should be appreciated that, with the opening 40 positioned over the number 1 on the slide cover, light can pass through the openings 36 and the hole 18 to the photocell 26 and the opening 24 is blocked. Should the envelope be reversed and inserted into the associated mechanism, the opening 24, namely the blocked opening, would be positioned between the photocell 26 and the light source and the photocell accordingly would not be activated. In this manner, the equipment associated with the floppy disc can only write on or read from the side, 1 or 2, which is associated with the slide position selected. That is if the slide is positioned with the hole 40 adjacent to the number 1, then writing and reading from the surface associated with that number can take place and not from the other side. In order to permit writing and reading from side number 2, the hole 40 must be positioned adjacent number 2 on the slide cover whereby the opening 44 is aligned with opening 38 and 24. The hole 18 in that case would be covered. A black marking 46 may be placed on the envelope 12 opposite the opening 34 to assist in seeing the opening 40. This is done when, for appearance sake, it may be desirable to make the slide 32, the envelope 12, and the slide cover 30 all of the same color.

FIG. 2 shows the appearance of the disc including the embodiment of the invention when it is assembled. Similar functioning structure bears the same reference as the structure shown in FIG. 1.

FIG. 3 is a back view of the disc and envelope or a view opposite to the one shown in FIG. 2. It will be seen that the positions of the openings 22 and 24 are reversed. Openings are provided in the envelope to enable engagement of the disc by the hub and head on this side, which may be designated as side number 2.

FIG. 4 is a block schematic diagram illustrative of the electronic circuit arrangement which may be used with the embodiment of the invention. A disc 10 has one side designated as side 1 and the other side designated as side 2. The disc is held by a rotating hub 56 against a backing 58. A light source 60, emits light at the location of one of the openings either 22 or 24. In the arrangement shown in the drawing, since side 2 is adjacent to the head, then the opening 24 would be the one interposed between the light source and the "photocell and amplifier" 62. Accordingly, in order to enable the transducer head 64, to read or write, the slide 32 must be positioned with the opening 44 aligned with opening 30 and 24. This occurs when the slide is moved so that the hole 40 is over the number 2 in the slide cover.

As the disc rotates, pulses are generated by the photocell and amplifer 62. These pulses provide a "ready" and a "track start" signal. This can enable circuits 66, to provide data, and also provide an enabling signal to the head control circuits 68, when they are received at the proper frequency, indicative of the fact that the disc is being rotated at a proper speed. The head control circuits also enables data to flow from the data circuits to the transducer head for writing, and also enables the head to read.

It will be apparent that when the slide 32 is positioned with the hole 40 over the number 1 on the slide cover, light is blocked from actuating the photocell and amplifier 62 and no writing or reading from side 2 of the disc can occur. In this way, inadvertent loss of data from the disc is prevented. The slide must be positioned and the disc must be inserted so that the photocell is enabled from the light source, otherwise the system is inoperative.

FIG. 5 shows an alternative arrangement for an embodiment of the invention. Instead of an opaque slide 42 a pivotal opaque member 70 may be used. This member is pivotably attached to the envelope 12 at pivotal point 72. It can be pivoted to the position marked with a "1" on the envelope which blocks hole 22 so that only side 2 of the floppy disc 10 can be written on or read from. It can also be pivoted to the position marked with a "2" on the envelope which blocks hole 24 so that only side 1 of the floppy disc can be used.

Other techniques for selectively covering or uncovering the envelope holes will be apparent to those skilled in the art without departing from the spirit and scope of the claims. These may be individual flaps on the disc envelope which are selectively moveable to expose or cover the hole for example, or the moveable opaque member may even be supported within the user apparatus.

Furthermore, while the invention has been described using a single hole in the floppy disc, it is obvious to those skilled in the art to use a plurality of holes in the disc spaced around the periphery of a circle for generating a plurality of pulses during one revolution of the disc.

There has accordingly been shown and described above a novel and simple arrangement for insuring that there is no data loss when that data is recorded on the slide of a disc in which it should be recorded.

The embodiments of the invention in which an exclusive property or privilege is claimed are defined as follows:

1. In a system wherein a floppy magnetic disc which is rotated within an envelope, is inserted into associated apparatus for rotation of said disc and for applying a magnetic transducer head to one side thereof for reading and writing, apparatus for insuring that writing or erasure from said disc will occur from a desired one side, and not inadvertently from the other side of said disc comprising a first and a second hole through said envelope,
    said first and second holes being positioned on either side of a center line through said envelope, and radially equidistant from the center of said envelope and disc,
    a third hole through said disc positioned to be aligned successively with said first and second holes once each revolution of said disc,
    a light source positioned within said associated apparatus for directing light through said first hole when said disc and envelope are operatively inserted within said apparatus with one side adjacent to said transducer, and for directing light through said second hole when said disc and envelope are inserted within said apparatus with the other side adjacent to said transducer,
    photocell means positioned opposite said light source for receiving light from said light source through said first hole when said disc is operatively inserted within said apparatus with said one side adjacent said transducer and for receiving light from said light source through said second hole, when said disc is operatively inserted within said apparatus with said other side adjacent said transducer, moveable means, moveable for selectively covering said first hole and permitting light from said light source to pass through said second hole, or for covering said second hole and permitting light to pass from said light source through said first hole, and means responsive to the output of said photocell means when it is actuated, for enabling said transducer means to function.

2. In a system as recited in claim 1 wherein said moveable means comprises a piece of opaque material having an opening therethrough, means for slidably holding said opaque material on said envelope for enabling motion of said opaque material to selectively position its opening coaxially with said first or said second opening, and said piece of opaque material including a means for enabling engagement thereof for enabling selective positioning thereof.

3. In a system as recited in claim 2 wherein said means for slidably holding said opaque material comprises a sheet of material attached by its ends to said envelope to form an elongated hollow chamber between it and said envelope, for enclosing and guiding said opaque material, said sheet of material having a first opening therethrough to enable engagement of said means for enabling engagement of said piece of opaque material.

4. In a system as recited in claim 1 wherein said moveable means comprises a piece of opaque material, and means for pivotably supporting said opaque material on said envelope for enabling pivoting thereof to selectively cover said first or said second hole.

* * * * *